R. A. MacDONELL.
MUD HOOK.
APPLICATION FILED SEPT. 17, 1912.
1,065,064.
Patented June 17, 1913.
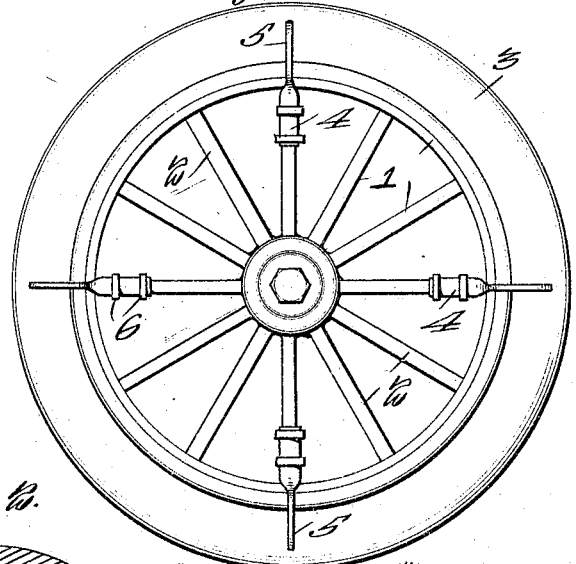
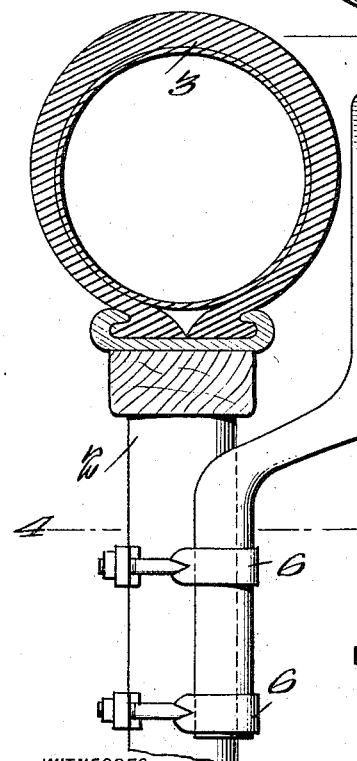
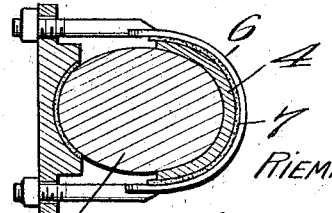
WITNESSES
E. W. Callaghan
A. B. Ports
INVENTOR
RIEMAN A. MacDONELL,
BY William S. Jones
ATTORNEY

UNITED STATES PATENT OFFICE.

RIEMAN A. MacDONELL, OF FERNANDINA, FLORIDA.

MUD-HOOK.

1,065,064.

Specification of Letters Patent.   Patented June 17, 1913.

Application filed September 17, 1912. Serial No. 720,812.

*To all whom it may concern:*

Be it known that I, RIEMAN A. MAC-DONELL, a citizen of the United States, residing at Fernandina, in the county of Nassau and State of Florida, have invented certain new and useful Improvements in Mud-Hooks, of which the following is a specification.

My invention relates to traction grips designed for the purpose of assisting automobiles in pulling out of heavy sand, mud, and such other places where the wheels cannot get a grip upon the ground.

The objects of my invention are to provide a traction grip which is extremely simple in construction and composed of a minimum number of parts; which when not in active use, can be packed or stored away in a very small space; which may be attached to the wheels permanently, if so desired, without interfering with the movement of the car; and to provide a device which may be securely attached to the wheels in the very shortest space of time without the slightest inconvenience.

To the accomplishment of the recited objects and other coördinate therewith, the preferred embodiment of my invention resides in that construction and arrangement of parts hereinafter described, illustrated in the accompanying drawings, and embraced within the scope of the appended claim.

In said drawings: Figure 1 is a side elevation of a wheel showing the application of my invention. Fig. 2 is a detail transverse sectional elevation of the pneumatic tire and a portion of one of the spokes, to which latter the traction grip is applied. Fig. 3 is a detail end elevation of the device removed, and Fig. 4 is a transverse sectional view taken along lines 4—4 of Fig. 2.

The traction grip embodying my invention consists of a single piece of metal having one extremity concave to correspond to the contour of the spokes of a wheel, in combination with a pair of clamping members which pass over the said concave portion of the device and are secured to opposite sides of the spokes, the said extremity merging outwardly into a flat paddle-shaped portion which lies at right angles to the plane of rotation of the wheel and terminates a slight distance short of the periphery of the tire.

Referring more particularly to the drawings for a detail description of my invention the numeral 1 designates a conventional type of automobile wheel having the usual spokes 2 and a resilient or pneumatic tire, as 3. The traction device or grip, which forms the subject-matter of my invention, comprises a single or integral piece of metal having one extremity, as 4, concave and merging outwardly to another extremity 5 which is flat and shaped somewhat similar to a paddle. For the purpose of clarity in describing my invention, the portions 4 and 5 of the device will be styled inner and outer extremities, respectively, of the grip. As will be found upon inspection of Fig. 2 of the drawings, the concave inner extremity 4 is placed longitudinally of and contiguous the spoke 2 at a point adjacent to the connection of the spoke with the rim of the wheel, and is secured at opposite ends by a pair of clamps, as 6. In order to avoid chafing of the spokes pieces of felt 7 are placed between one side of the clamp and the spoke and between the concave extremity and the spoke on the other side.

It will be noted that the flat paddle-shaped portion of the traction grip lies in a plane at right angles to the plane of rotation of the wheel and that it terminates at a point short of the periphery of the tire. In Fig. 1 of the drawings four of the traction grips are shown applied to the wheel, but it will be obvious that any number of the devices may be used.

If desired, the traction grips may be placed upon the rear wheels of an automobile and used permanently, or they may be carried as a part of the equipment of the car and employed only when necessary. The permanent or temporary use of the grip depends to a great extent upon the particular section of the country in which an automobile travels: if the country is sandy and muddy it would be desirable to permanently attach the devices to the wheels of the machine, but if the roads are in good condition and have only limited stretches of sand or mud it would be advisable to use the grips only in case of emergencies. The reason why the grips can be used as a permanent fixture to the wheels is that the outer terminal of the paddle-shaped portion 5 is above the point where the tire engages the surface of the ground, and in the event of any small stones or similar obstructions lying in the path of the portion 5 it will be manifest that the same will be thrown or knocked to the side of the wheel. On the other hand, if the rocks or obstructions are of unusually large proportion, the device may be adjusted inwardly toward the hub of the wheel so that there will be absolutely no danger of breaking, twisting or otherwise injuring the grips.

In action, that is to say, when the machine encounters mud or sand, the wheels will naturally sink into the mud or sand, whereupon the paddle-shaped portion 5 will be brought into engagement with the mud or sand and owing to its rigid connection with the spoke of the wheel, there will be sufficient traction set-up to insure an uninterrupted advance of the machine. Another important feature is that when not in use the traction grips do not tend to wear or cut the tire, as is the case with chains which are used to a great extent at the present time.

It should be understood that in its broader aspect the invention comprehends the employment not only of the various means described, but of equivalent means for performing the recited functions. While the arrangement shown is thought at the present time to be preferable, it is desired to reserve the right to effect such modifications and variations thereof as may come fairly within the scope of the appended claim.

What is claimed is:—

The combination with a wheel provided with a tire, of an anti-skidding device comprising an integral piece of metal having extremities disposed substantially in parallelism and an intermediate connecting portion arranged approximately at right angles to said extremities, one of said extremities being concave and the other extremity being flat and lying in a plane at right angles to the plane of rotation of the wheel, said last mentioned extremity also being spaced from the adjacent side of the tire and terminating short of the periphery of the tire in active position, and means for fastening the concave extremity to a spoke of said wheel.

In testimony whereof I hereunto affix my signature in presence of two witnesses.

RIEMAN A. MacDONELL.

Witnesses:
E. P. MacDONELL,
J. B. MURPHY.

---

Copies of this patent may be obtained for five cents each, by addressing the "Commissioner of Patents, Washington, D. C."